Oct. 21, 1924.

W. L. BEALL 1,512,519

AGITATOR FOR FEED GRINDERS

Filed Nov. 29, 1920

Inventor:-
William L. Beall,
By H. P. Davies
Atty.

Patented Oct. 21, 1924.

1,512,519

UNITED STATES PATENT OFFICE.

WILLIAM L. BEALL, OF CHATTANOOGA, TENNESSEE, ASSIGNOR TO INTERNATIONAL HARVESTER COMPANY, A CORPORATION OF NEW JERSEY.

AGITATOR FOR FEED GRINDERS.

Application filed November 29, 1920. Serial No. 426,991.

*To all whom it may concern:*

Be it known that I, WILLIAM L. BEALL, a citizen of the United States, residing at Chattanooga, in the county of Hamilton and State of Tennessee, have invented certain new and useful Improvements in Agitators for Feed Grinders, of which the following is a full, clear, and exact specification.

My invention relates to feed grinders or mills of the type having a relatively large hopper with sides converging toward the bottom where the crushing and feeding mechanism for the grinding discs is located. In the operation of such grinders, the hopper is filled with grain or ears of corn which is supplied by gravity to the crushing and feeding mechanism. It frequently occurs that the grain packs in the hopper or the ears of corn bridge the hopper so that the grain cannot reach the feeding mechanism.

An object of my invention is therefore to provide means for agitating or loosening the grain so that packing or bridging in the hopper will not occur. Another object is to provide an agitating means in the hopper of a feed grinder whereby the grain will be supplied to the grinding discs at a uniform rate. These and other objects are accomplished by the mechanism illustrated in the accompanying drawings in which—

Figure 1:
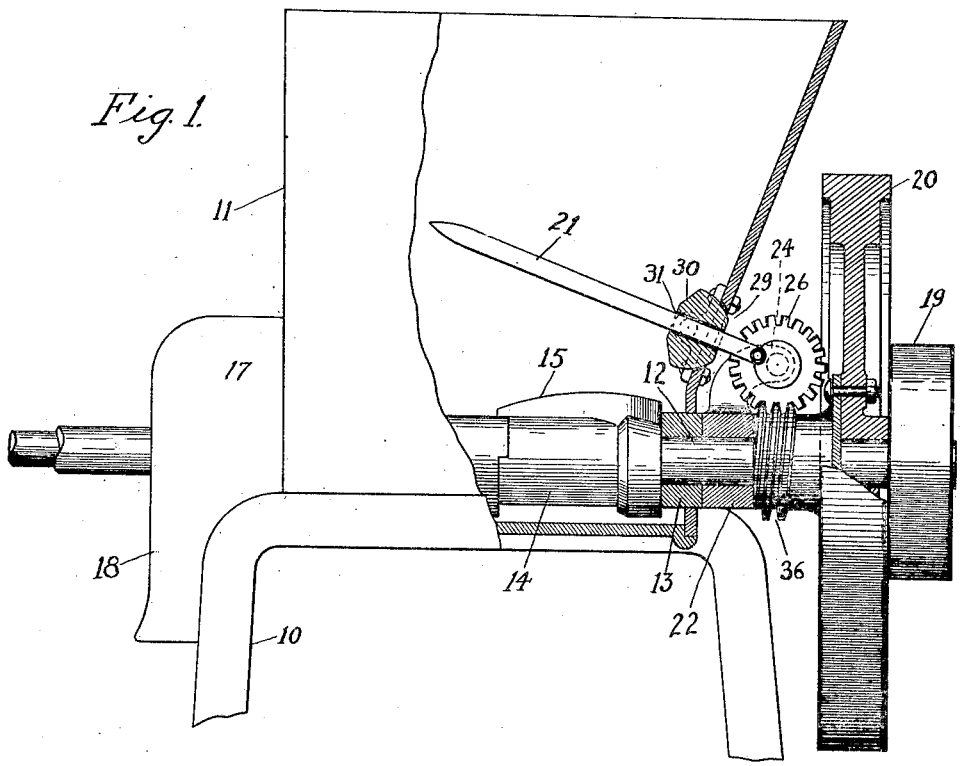
Fig. 1 is a side elevation, partly in section, of a feed grinder having my agitator applied thereto.
Figure 2:
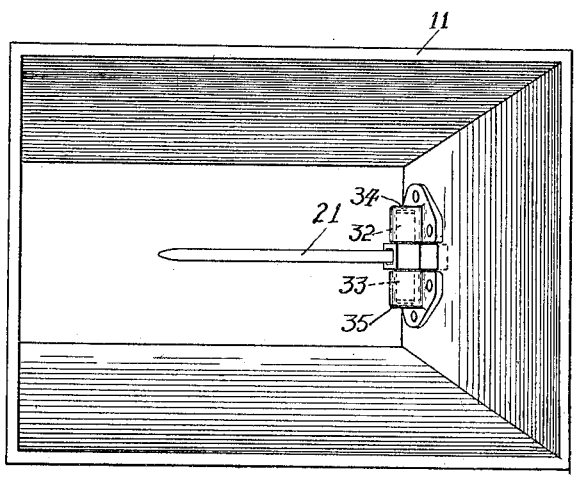
Fig. 2 is a plan view of the hopper showing the agitator arm.
Figure 3:
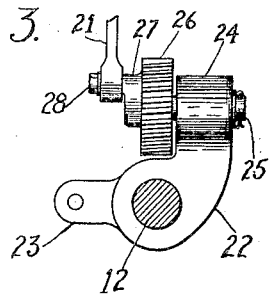
Fig. 3 is a detail of the driving mechanism for the agitator arm.

The mill shown in the drawings comprises a frame 10 on which is mounted the hopper 11. A drive shaft 12 is suitably journaled in bearings 13 (only one being shown) on the frame and has secured thereto a sleeve 14 to which is attached the helical feeding rib and cob breaker 15 which receives the feed from the hopper and after crushing or cutting the cobs advances the material along the bottom of the hopper to the grinding disks housed within the casing 17. The feed after being ground by the disc is discharged through the delivery spout 18. The shaft 12 is driven from the belt pulley 19 keyed to one end of the shaft adjacent the flywheel 20.

Within the hopper 11 is the agitator arm 21 driven from the shaft 12 as will now be described. A bracket 22 bored to receive the shaft 12 has a laterally protruding lug 23 by which it is secured to the frame 10 and an upwardly extending arm 24 in which is journaled a stub shaft 25 secured to and carrying a small worm wheel or pinion 26. The pinion 26 has a wrist pin 27 formed integral therewith and on which one end of the agitator arm is rotatably secured by a bolt 28. An opening 29 in the rear wall of the hopper is closed by an oscillating bearing having a slot or opening 31 through which the agitator arm slides. The oscillator 30 closely fits the opening 29 to prevent the loss of grain therethrough, and is provided with trunnions 32, 33 journaled in bearing plates 34, 35 secured on opposite sides of the opening 29. The worm wheel 26 meshes with a worm 36 secured to the flywheel 20 as shown in Fig. 1, but the worm may be keyed to the shaft 12 if desired.

When the mill is being operated, the pinion 26 is rotated by reason of its engagement with the worm 36 and this causes the agitator 21 to reciprocate in the oscillator 30 and at the same time oscillate about the trunnions 32, 33, the combination of these two motions causing each point on the agitator to describe an elliptical orbit. It is to be noted that the free end of the arm travels an orbit of the greatest amplitude and extends to a point over the discharge opening to the grinding plates where the congestion in the hopper and tendency of the grain to pack is greatest, and where the agitator is most effective in keeping the grain loosened.

While I have shown and described but a single embodiment of my invention, I do not wish to be limited thereto, since it will be apparent to those skilled in the art that the agitator is capable of many modifications without departing from the spirit of my invention.

Having thus described my invention, what I claim as new and desire to secure by Letters Patent is:

1. In a grinding mill, the combination of a hopper, a bearing mounted for oscillation in an opening in a wall of the hopper, an agitator mounted in the bearing and extending into the hopper, and means for oscillating and reciprocating the agitator to prevent bridging of the material in the hopper, the bearing being so arranged in the hopper wall that leakage is prevented.

2. In a feed grinder, a frame, a hopper thereon a rotatable shaft extending through the hopper, a gear carried by the shaft and meshing with a gear mounted on the frame, an agitator arm pivotally connected to a pin on the second gear and extending into the hopper whereby rotation of the shaft will cause movement of the agitator within the hopper.

3. In a feed grinder, a frame, a hopper thereon a rotatable shaft mounted on the frame and extending through the hopper, a gear mounted on the shaft and meshing with a second gear mounted on the frame, an agitator pivotally secured to an eccentric pin on the second gear and slidable through a wall of the hopper, whereby the agitator will be reciprocated and oscillated within the hopper upon rotation of the shaft.

4. In a feed grinder, the combination of a support, a hopper and a rotatable shaft carried thereby, grinding mechanism at one side of the hopper driven from the shaft, feeding mechanism driven from the shaft adapted to feed grain from the hopper to the grinding mechanism, an agitator mounted in the wall of the hopper and having one end adjacent the grinding mechanism, the other end extending outside the hopper and driving connections between the shaft and agitator.

5. In a feed grinder, the combination of a support, a hopper thereon a rotatable shaft extending through the hopper, grinding mechanism driven from the shaft and located adjacent one wall of the hopper, and an agitator arm fulcrumed in the opposite wall of the hopper and having one end operable adjacent the grinding mechanism.

6. In a mill, the combination of a hopper, a rotatable shaft, an oscillatable bearing mounted on the hopper, an agitator arm slidable through the bearing and oscillatable therewith, and driving connections between the agitator arm and rotatable shaft.

7. In a mill, the combination of a hopper having an opening in one side wall, an oscillatable bearing adapted to close said opening, an agitator slidable through the oscillatable bearing and oscillatable therewith, and driving connections between the rotatable shaft and agitator whereby the latter will be oscillated and reciprocated through the bearing on rotation of the shaft.

In testimony whereof I affix my signature.

WILLIAM L. BEALL.